United States Patent [19]

Backe

[11] 4,335,442
[45] Jun. 15, 1982

[54] SYNCHRONOUS OSCILLATOR DEMODULATOR SYSTEM

[75] Inventor: Soren B. Backe, Dundee, Ill.

[73] Assignee: American Can Company, Greenwich, Conn.

[21] Appl. No.: 105,532

[22] Filed: Dec. 20, 1979

[51] Int. Cl.³ .............................................. G06J 1/00
[52] U.S. Cl. .................................... 364/608; 328/14; 336/130; 364/487
[58] Field of Search .............. 364/487, 607, 608, 718; 328/14; 336/130; 235/92 Y, 92 NC, 92 TF

[56] References Cited

U.S. PATENT DOCUMENTS

| | | | |
|---|---|---|---|
| 2,494,493 | 1/1950 | Schaevitz | 336/130 |
| 2,886,243 | 5/1959 | Sprague et al. | 364/608 |
| 3,513,301 | 5/1970 | Howe | 364/608 |
| 3,551,655 | 12/1970 | Walsh | 364/608 |
| 3,727,037 | 4/1973 | Zorn | 364/608 |
| 3,891,918 | 6/1975 | Ellis | 336/130 |

Primary Examiner—Errol A. Krass
Attorney, Agent, or Firm—Robert P. Auber; George P. Ziehmer; Stuart S. Bowie

[57] ABSTRACT

A synchronous oscillator demodulator for linear variable differential transformers and synchronous resolvers having electronic circuitry designed to digitally construct a preferred waveform of a predetermined frequency and to establish precisely the preset point at which the amplitude of the waveform is to be measured at the secondary winding of the transformer. This synchronous oscillator demodulator permits the use of linear variable differential transformers and synchronous resolvers for high frequency applications and under conditions of noise and vibration while still maintaining a high degree of accuracy and repeatability. A system and apparatus to enhance the signal from a given linear variable differential transformer and tune same in relation to the signals of other similar but not identical transformers is disclosed.

10 Claims, 4 Drawing Figures

LVDT SIGNAL CONDITIONER

SYNCHRONOUS OSCILLATOR DEMODULATOR SYSTEM

BACKGROUND OF THE INVENTION

This invention pertains to the input signal for the primary windings in a linear variable differential transformer hereafter LVDT or a synchronous resolver hereafter SR. Such devices are readily available and are disclosed in the early prior art, see, for example, the Macgeorge U.S. Pat. No. 2,427,866 covering an LVDT wound with symetrically spaced identical secondaries adjacent to a central primary on a common coil form wherein the core is longer than the primary winding. Similarly, a synchronous resolver is shown in the Schaevitz U.S. Pat. No. 2,494,493 wherein the coil form contains a pair of identical windings, and spaced symmetrically above and below the middle and within the coil is a core being a cardioidal shaped magnetic pivotally and eccentrically mounted on an input shaft positioned diametrically across the coil.

Linear movement of the core (LVDT) or rotation of the shaft (SR) influences the phase and amplitude of the waveform generated in the secondary in relation to the amount of movement or rotation.

The cross-section of a typical LVDT consists of three symmetrically spaced coils a primary and a pair of secondaries connected in series carefully wound about an insulated bobbin and four wire leads exited through one end. An outer shield of a ferro-magnetic material is placed over the windings which are vacuum impregnated with a suitable potting compound. Consequently, the finished transformer is impervious to humidity and magnetic influences. The core is made of a uniformly dense cylinder of nickle-iron alloy which is annealed to improve its homogeniety with respect to magnetic permeability. The LVDT is a frictionless device since there is no physical contact between the movable core and the LVDT coil structure. The absence of friction and contact between the coil and the core of an LVDT means that there is nothing to wear out and gives the LVDT an essential infinite mechanical life.

The nominal linear range of travel of an LVDT is the distance the core may be displaced in either direction from its null position. The symmetry of the LVDT construction provides null point repeatability. More particularly, the LVDT produce an electronic output proportional to the placement of the movable core. A waveform excitation applied to the primary induces a similar excitation in the secondary. The two identical secondaries are symmetrically spaced from the primary and adjacent thereto in axial relation therewith on each side thereof. The secondaries are connected in a series opposing circuit. As the motion of the noncontacting magnetic core varies, the magnetic inductance of each secondary relative to the primary is thereby determined by the induced voltage difference. If the core is moved off center, the magnetic inductance of the primary with respect to one secondary will be greater than with respect to the other and a differential voltage will appear across the secondary output terminals. For offset displacements within the normal operating range, the voltage is a linear function with respect to displacement with some deviation due to tolerances in fabrication of the LVDT.

When the middle of the core is centered between the secondary windings i.e., is at the center point of the primary winding, the voltage induced in each secondary is equal and 180° out of phase so there is no secondary output.

Certainty of waveform shape and frequency is absolutely essential to proper measurement of small differences in linear displacement at high periodicities. Therefore, uniform waveforms with a frequency greater than that of the oscillation of the core are required for accuracy and repeatability. The use of 60 Hz power line frequency for excitation of the primary coil is acceptable for core oscillations under six cycles per second. Normal the concept is that the excitation frequency must be at least ten times greater than the highest modulation frequency to be measured as a component of mechanical motion.

The majority of LVDT applications apply sine waveforms to the primary coil which waveforms should be free from harmonic distortions since modulated distortion may increase the null voltage. Excessive null voltage requires filtering the excitation voltage and/or the LVDT output to remove harmonics which affect the accuracy in connection with measuring small displacements at high frequencies. Moreover, the variations in output from one LVDT to another require a means by which the LVDT's can be equalized and their deviation from linearity can be minimized to a point where it is negligible.

The improvement of the present invention will provide a uniform high frequency waveform and a means to specify the point on said waveform where the amplitude of the output from the secondaries will be used. Similarly, the output from the secondaries of any given LVDT will be corrected to overcome any deviations due to particular characteristics of the LVDT relative to an ideal LVDT with totally linear response.

OBJECTS OF THE INVENTION

It is an object of the invention to provide a waveform generator circuit which will enable an LVDT to measure high frequency displacements.

It is a further object of the invention to provide an electronic circuit which will permit each of a plurality of LVDT's to be tuned and calibrated so that they measure small displacements at high frequencies accurately and repeatably.

There is yet another object of the invention to provide a readout system which will give a permanent and quickly interpreted display of the measurements obtained by the LVDT and electronic circuitry.

It is still another object of the invention to provide an accurate, reliable, stable and repeatable system for measuring the high frequency oscillations in a travel range which may vary less than 1/10,000 of an inch. The foregoing objects and problems of the prior art will be accomplished and overcome respectively by electronic circuitry and its adaptation for use with LVDT's.

SUMMARY OF THE INVENTION

A waveform generator circuit is disclosed and includes electronic micro-circuitry for counting at a prescribed rate. The counting takes place at a rate sufficiently high to be used for generating a waveform appropriate for the excitation rate necessary to drive the primary of an LVDT used for measuring changes in linear distance which takes place at an oscillation frequency of several hundred per minute. More particularly, the frequency of 125 strokes per minute as disclosed in U.S. Pat. No. 4,213,319, issued July 22, 1980 for a thickness gauge must be measured by a waveform with a frequency of at least 1250 cycles per minute. The preferred embodiment of the disclosure herein is for use in connection with that thickness gauge and requires high accuracy in an environment of great noise and vibration. The transducer in that application are the LVDT from which the signal emanates and for which signal conditioning and enhancement as disclosed herein is required.

The enhancement circuit calculates the thickness reading from a given LVDT voltage signal and in doing so minimizes any individual undesirable characteristics of that LVDT to the point where such characteristics are ignorable. Multiple LVDT transducers may be used to measure various positions across a skeleton web in the preferred embodiment without concern for tolerance differences between them. More specifically, the present circuit permits the LVDT to be used in the range of its maximum linearity and overcomes the voltage output differences relative to core travel. The unique characteristics of each LVDT are thereby accounted for and the voltage signals are converted to relevant units of measure to a resolution of more than 0.0001 inches.

The data so obtained and transformed is stored in a computer until the readout is required; at that time a tabular format for the printout or cathode ray tube display is used. The tubular format is constructed to permit prompt trend interpretation and out of tolerance isolation by relatively unskilled personnel. More specifically, the position of the data in the table is directly related to the amount by which the tolerance of the thickness is out of specification. Consequently, a row of data will shift with the trend and odd data will immediately stand out.

DETAILED DESCRIPTION OF THE DRAWINGS

Figure 1:
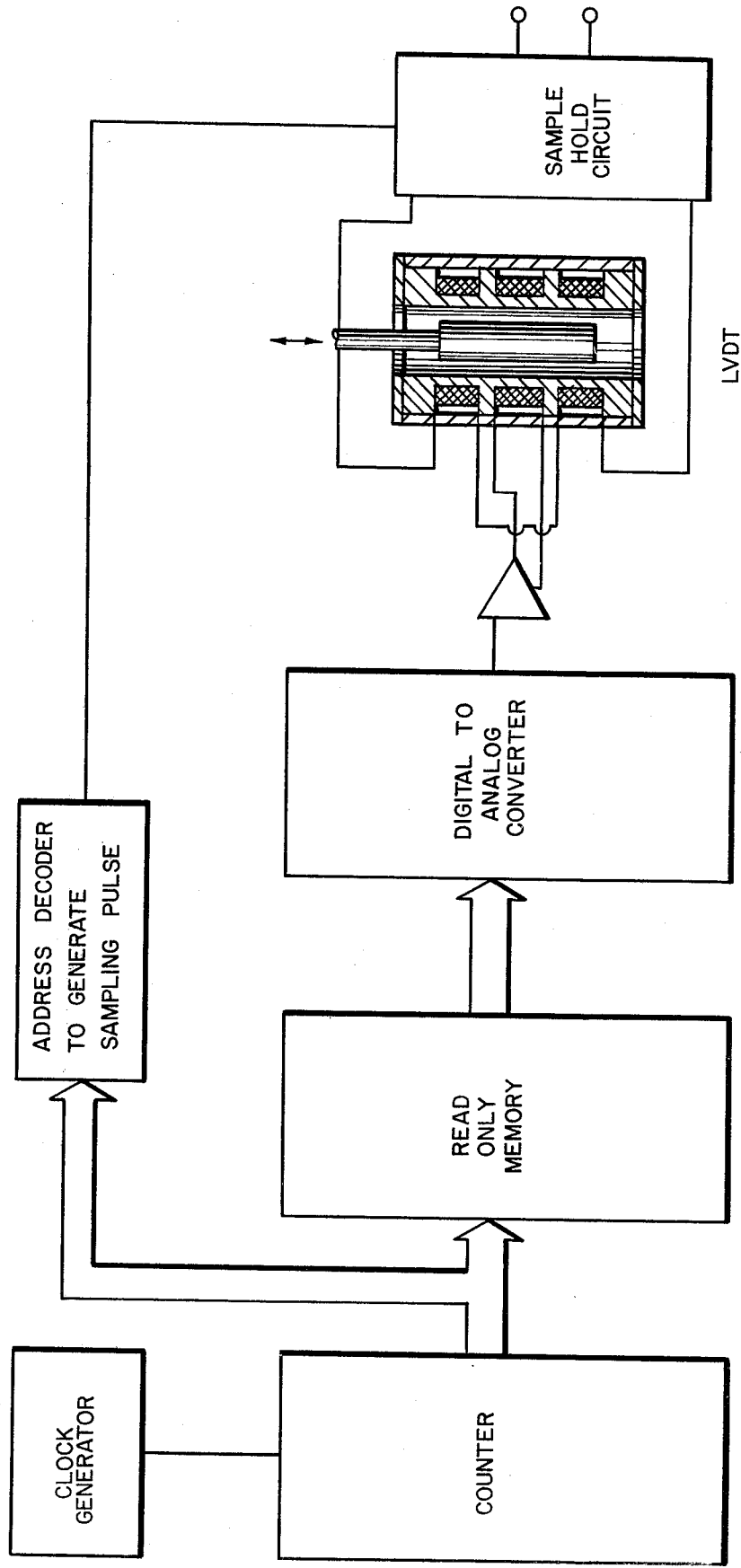
FIG. 1 is a substantially schematic circuit diagram showing the electronic components for conditioning a signal to be amplified for the LVDT input.

In FIG. 1, an electronic circuit is shown for developing a preferred waveform of a specific frequency. The preferred waveform is a sine wave and in order to generate a sine wave of an appropriate frequency for use with the output from the thickness sensors hereinbefore described, there is a clock generator which presents a continuous series of periodic pulses each of which are 0.5 μs in duration. A crystal oscillator is used to set the frequency period. The clock pulses are transmitted to a counter which consists of a series of flip-flop circuits contained in 3, 4-bit binary counters. While 12-bits are available only 10 are used for the preferred embodiment. The flip-flops determine how many 0.5 μs pulses are passed into the counter. 1024 Pulses are counted within 1/2000 of a second. The counter is arranged to note when 1024 counts have been made and begin counting from zero once again. Consequently, the counter is continuously incremented and recirculated when driven by the clock pulses from the clock generator. The counter has 12 connections to a read only memory chip. The 12 connections from the counter are used to represent the numbers 1 through 1024 in the binary numbering system. Consequently, an individual signal is given to the read only memory from the counter for each count, and such signals are specifically entered in the read only memory. Also connected to the counter by 12 lines is an address decoder which is set to generate an output pulse once every cycle of the sine wave. This pulse is typically generated at the peak of the sine wave in the secondary windings. By selecting the decoder pulse it is thus possible to compensate for possible phase shift of LVDT or SR. The phase shift can be determined by using an oscilloscope. More particularly the timing is arranged to coincide with the peak of a sine wave to be generated by the read only memory. That is, data is stored in the read only memory which gives the amplitude of a sine wave signal at each of the counts from the counter. Therefore, the sine wave can be numerically generated. More particularly, the read only memory is programmed with the data that can be fed into a digital-to-analog converter to generate a sine wave. Each count is used to provide a timing input to trigger the stored data output of the specific amplitude. In the preferred embodiment 1024 points of amplitude data are generated to specify the sine function with respect to time.

The amplitude values in binary form are transmitted by 12 data lines from the read only memory to a digital-to-analog converter. More specifically, a digital-to-analog converter translates the binary amplitude number into a measurable voltage which varies with changing amplitude to generate the sine wave. The mathematically constructed analog signal represents a sine wave of the specified preset frequency and it is amplified and transmitted to the primary coil of an LVDT or an SR. The secondaries of the LVDT inductively pick up the amplified sine wave and in accordance with the position of the LVDT core, transmit the induced signal to a sample and hold circuit.

The sample and hold circuit memorizes the amplitude of the sine wave from the secondary windings. Sampling pulses transmitted, each cycle relative to the digitally constructed sine wave, from the address decoder are used to trip the sample and hold signal at the point where the amplitude of the secondary sine wave is to be read. Consequently, the secondary output is read at a prescribed amplitude point per the signal from the address decoder.

Another means by which the sine wave for the primary of the LVDT can be generated is through the use of microprocessor instead of the clock generator and counter. Such a microprocessor would be programmed with an algorithm to determine the particular analog function to be generated i.e., a sine wave, a triangular waveform or any other regular function. Such programming would also cause the sample pulse to occur at a preselected time during the particular function. Therefore, as the program in the read only memory is executed by the microprocessor, data is transmitted to the digital-to-analog converter whereby an analog output is available for amplification to drive the LVDT or SR. The rest of the circuit is essentially the same. Yet another approach would be to replace the counter with an up/down counter which would reverse its counting direction when it reached the preset limit and thereby count back to zero and reverse again. Such an approach could be used by connecting directly to the digital-to-analog converter which would generate an analog output voltage to represent the continuously incremented and deincremented counting of the up/down counter. Typically, a triangular waveform would be generated at the rate of counting. Once again a sample pulse decoder would specify the point at which the function would be read at the output side of the secondaries of the LVDT. The decoder is the same as described before and it generates the sampling pulse.

Figure 2:
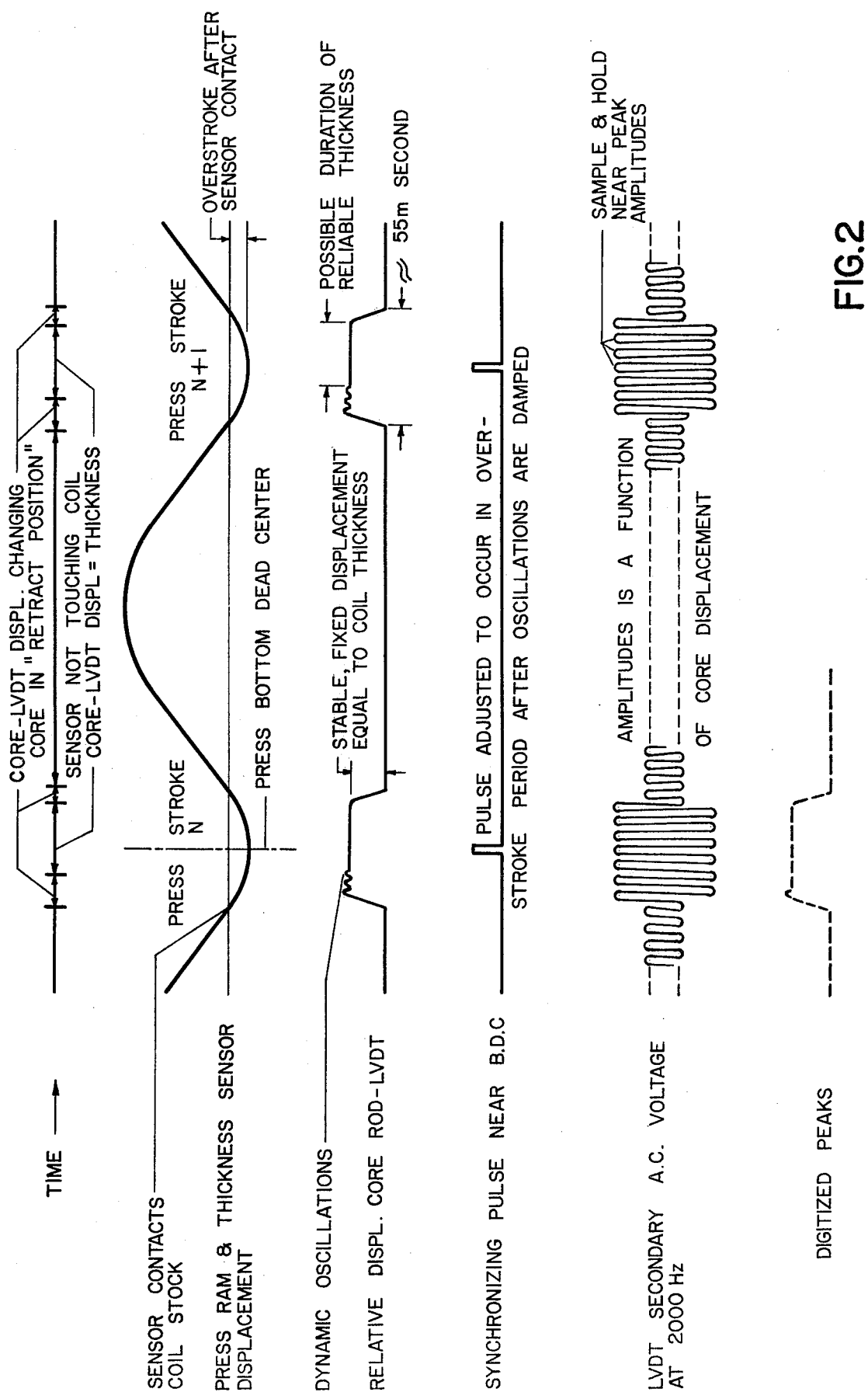
FIG. 2 is a series of schematic timing diagram illustrative of the signals in the signal conditioning circuit.

FIG. 2 shows the schematic timing diagrams for the preferred embodiment, more specifically when the core of the LVDT is located within the thickness gauge. Three thickness gauges are attached to the ram of a metal working press and move up and down therewith at a rate of approximately 125 strokes per minute. As each thickness gauge is brought to bear across the skeleton whereby a portion of the gauge rests on the press platten beneath the skeleton and another sensor portion bears upon the scrap. The relative difference between the portions is a measure of the scrap thickness. That difference is periodically transmitted to the core of the LVDT as shown in FIG. 2. The core changes position with respect to time in that it is first moving with the press ram and then it is moving with respect to the press ram. As it is displaced by the scrap thickness, it is moving with respect to the press ram. The stroke of the press ram is sinusoidal (FIG. 2) and the thickness gauge is designed to overstroke relative to the stroke of the press ram since the portions therein are resiliently mounted. The sinusoidal time diagram for the thickness gauge shows the press ram motion relative to the sensor portion during contact with the coil stock. More particularly, on stroke "N", the sensor is in contact with the stock for a period (55 ms) greater than just the instant at which the press ram reaches the bottom of its stroke and begins to return. Similarly, the sensor contacts the coil and overstrokes on the press stroke "N+1". Overstroking is necessary since the output from the LVDT core rod movement during overstroking initially includes oscillations at the instance of contact with the coil stock. Such core oscillations diminish rapidly during the overstroke and a point is reached whereat a stable and repeatable signal can be taken from the LVDT (see FIG. 2) and that signal is a reliable measure of the stock thickness.

A synchronized pulse having a period commensurate with the timing of the stable, repeatable, fully damped output from the LVDT is generated by any convenient means, e.g. a switch connected to the press ram or a clock generator and is used to specify the point during the overstroke at which the thickness reading defined by the core displacement will be taken. The LVDT primary is driven with a sine wave having an amplitude of over 2000 cycles per second. Consequently, the secondary output of the LVDT is over 2000 cycles per second. In addition to that, the output of the secondary windings will peak at known points in accordance with cycling and the signal conditioning as shown in FIG. 1 and herein described. It is, therefore possible to select points by means of a sample and hold circuit at which the secondary output will be used to measure the thickness. In essence, such a sample and hold circuit generates a digitized signal giving a definite peak at which the output can be monitored as a voltage representative of the thickness of the coil stock. At any instant such a voltage is a measurement received from one of the three thickness gauges.

Figure 3:
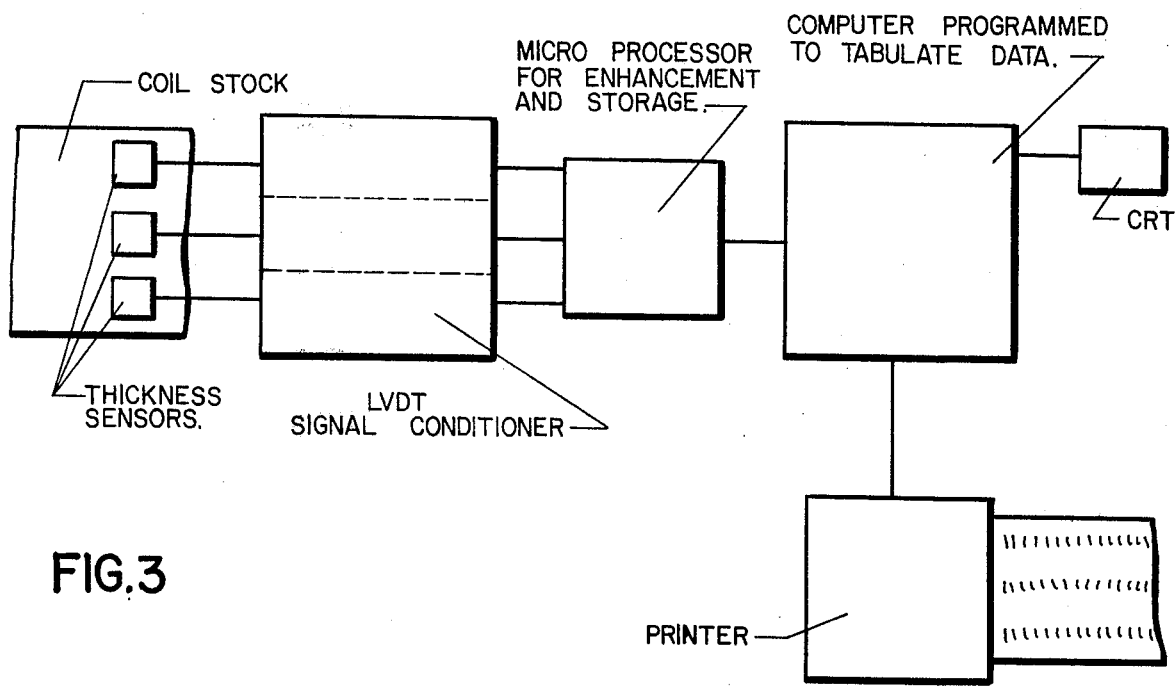
FIG. 3 is a schematic of the preferred embodiment and its relationship with the input and output apparatus.

In FIG. 3, there is a schematic showing of how the aforesaid voltage signal is generated by the three thickness sensors and transmitted to three LVDT signal conditioners which convert the signals to three output voltages at any instant during which readings are taken. These three output voltages are transferred to a microprocessor for enhancement and storage. Part of the storage function is to arrange the outputs in seriatum fashion so that it is known from which thickness sensor a particular output arrived. The microprocessor is designed to take each signal and decide from which thickness sensor it was derived and then tune that output voltage in accordance with the particular characteristic from the measuring LVDT of its thickness sensor. More particularly, and as discussed herein, each LVDT has its own characteristic which must be accounted for in order to tune each output signal and equalize it relative to the other output signals from the other thickness sensors. The microprocessor is programmed with a formula to be used to convert and tune each.

Figure 4:
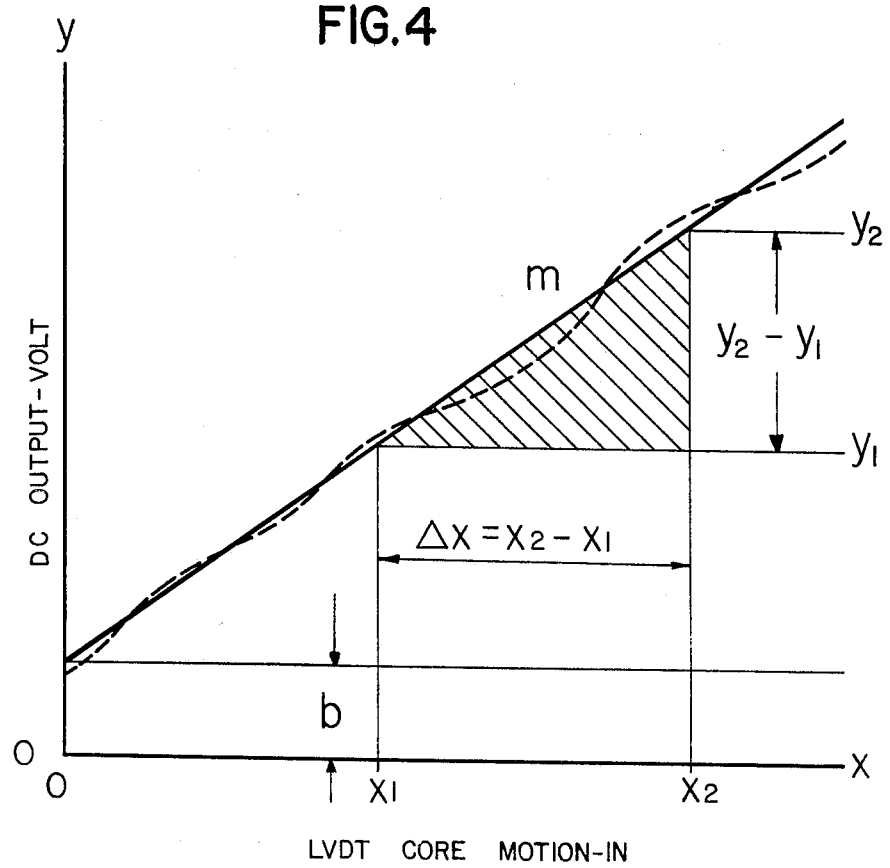
FIG. 4 is a graphic showing of the formula which is used to enhance the output signal from the single conditioning circuit.

In FIG. 4, the dashed line represents the true output from an individual LVDT and the straight line with the equation:

$$y = mx + b$$

will pass through $y_2$ and $y_1$ intercepting the y axis at "offset" voltage "b". The slope of the straight line is "m" (expressed in volts per inch) and it can also be called the "scale factor". The LVDTs rarely have the same null voltage or scale factor because of the difficulty of making all secondary windings identical. More specifically, it is impossible to make all LVDT windings of the same performance values and accuracy. In the thickness gauge application the accuracy of thickness readings must be in the range of 0.0090″ to 0.0130. The idealized straight line for each of the three LVDT sensors used is established using gauge plates. Each plate measure $1\frac{3}{4}'' \times 5''$ and is perforated with $3\frac{3}{4}''$ diameter holes to permit passage of the outer three pins of the outer coaxial plunger on each sensor. Thickness in the triangular area can be measured to the nearest 0.00001″ by conventional means (Jo blocks, comparator, etc.), and to calibrate the press is jogged to the bottom dead center position where the output voltage corresponding to the known thickness gauge plates are recorded. In this manner a voltage $y_1$ corresponding to a known thickness $x_1$ and a voltage $y_2$ corresponding to known thickness $x_2$ can be found. Thus, multiple readings can be taken to minimize the possibility of errors due to reading inaccuracy or variations due to mechanical tolerances. As a further check, static readings from the actual coil stock are taken and the scrap skeletons are retrieved for later measurement.

The scale factor "m" is the slope of a straight diagonal line in FIG. 4, and the numerical value of "m" can be calculated from the known values of voltage and thickness:

$$m = (y_2 - y_1)/(x_2 - x_1).$$

For a given sensor, this establishes its scale factor based on a voltage which includes the effects of AC excitation, LVDT characteristics, and amplifier gain. With "m" known, the offset voltage, "b" can be calculated for any thickness $x_1$ as $(b = y_1 - mx_1)$.

It follows that for any thickness $x_n$, within the linear range of the system, the desired thickness can be found from the equation $$x_n = (y_n - b)/m.$$

This is the relationship used by the microprocessor, FIG. 3, to convert and enhance an electrical signal to a thickness reading for a given sensor. Expressed in words, the thickness (being sensed) is equal to the DC output voltage minus the offset voltage divided by the scale factor for the given sensor.

The foregoing procedure enhances the output of the LVDT and overcomes the variations due to LVDT construction parameters. More particularly, there can be nonuniform wire cross-section or insulation and/or nonuniform winding of the coil (turns/cross-sectional inch). Similarly, coil strain due to packaging in the protective metal outer shell can distort carefully wound coils changing the scale factor or the offset. Maximum deviations from an idealized straight line relationship usually occur near the null position or near the ends of the "linear range". LVDT vendors' linearity specifications are optimized to make them look as good as possible over the entire useful range of displacement of their LVDT's and that makes them interchangeable and affordable. If their specifications are not good enough for the application, the buyer must pay extra to get better specifications. The limits of the state of the art of fabrication technology are only aided by weeding out the poorly made units and selling the good ones; even so, the tolerances are uncertain and unacceptable for measuring in the range of the thickness gauge application. The microprocessor enhancement circuit enables the use of LVDT's which have different characteristics and thereby eliminates the cost of purchasing high priced, selected LVDT's which essentially cannot provide accurate readings to 0.0001 of an inch. The enhancement permits the use of any LVDT in the area within its range that has the best linearity. Even if the LVDT is nonlinear a series of measurements with gauge plates can be used to plot actual performance and thereby program the microprocessor to translate any voltage output to that of a straight line function. In the preferred embodiment the LVDT accuracy is sufficient to approximate the core travel range having best linearity with a straight line.

The enhancement signals from the microprocessor in FIG. 3 represent corrected, tuned output voltages from the thickness gauge sensors. These outputs are fed seriatum to a computer programmed to convert the data to linear measure and tabulate same. The computer is connected to a cathode ray tube for instantaneous readout at any given convenient location. The computer is also connected to a printer so that the data may be accumulated and recorded for later analysis. The format for the tabulation is such that the data is printed in three columns. Each column is associated with a particular thickness gauge sensor, and each column has a tolerance range which is visually depicted by shifting the decimal point and the number associated therewith to the left or right in that column, should the thickness in numerical value be greater or less than the ideal respectively. That is to say that, as the stock thickness is measured thinner than a predetermined ideal, the entire thickness reading is printed out or appears on the cathode ray tube shifted to the right an amount equal to the tolerance difference.

By this technique the column of data tends to weave in a wave-like manner to the left and right in accordance with variations in the specific tolerances of the coil thickness. An unskilled operator can immediately perceive that the stock is somewhat out of specification, occasionally out of specification or completely out of specification. The computer is also programmed to tabulate and summarize the mean and average thickness about every two minutes whereby a summary of the material fed through the press can be monitored.

While a particular application has been shown for the excitation of an LVDT and for the enhancement of the signal emanating from the LVDT and for particular print out of the signal so obtained, it is believed that those skilled in the arts which pertain to these devices will appreciate changes which will make this applicable for use with an SR and other similar waveform driven devices. It is also desired that the enhancement technique of approximating a function with a known function and shifting same by rotation and translation as disclosed will be applicable apart from the particular application of thickness gauge sensing. Therefore, the claims which follow are meant to appropriately cover the invention in its broadest aspects and most far ranging applications.

What is claimed is:

1. An electronic circuit apparatus for generating a waveform to drive a transformer primary circuit and to signal the time at which a prearranged point on said waveform occurs for measuring the output amplitude of the transformer secondary circuit at that point comprising:

a means for dividing up time into uniform equal components of a frequency adequate to provide a plurality of segments within a prescribed time cycle, a means connected to said dividing means to receive said segments for accumulating a predefined number of said segments which make up one said waveform and for assigning an address to each side segment, a first electronic operating device connected to receive said addressed segments being a read only memory set to associate an output being data defining that amplitude of a waveform with each set of said addressed segments, and a second electronic operating device also connected to receive said addressed segments from said receiving means for identifying preselected addressed segments for signalling a point in time on each waveform cycle for use to initiate the monitoring of a respective output of said transformer secondary circuit, said point signal from said second electronic operating device being transmitted to a sample and hold circuit connected to said transformer secondary circuit for measuring the transformer secondary output held by said circuit at that respective point in time.

2. The circuit apparatus of claim 1 wherein said transformer includes a means by which the magnetic characteristics of same can be varied.

3. The circuit apparatus of claim 2 wherein said transformer is an LVDT.

4. The circuit apparatus of claim 2 wherein said transformer is an SR.

5. The circuit apparatus of claim 1 wherein said waveform is a sine wave having a frequency of several thousand cycles per second.

6. The circuit apparatus of claim 1 wherein said first electronic operating device is programmed to generate a sine wave function and said segments are addressed in binary form.

7. The circuit apparatus of claim 6 wherein said second electronic operating device is an address decoder which is set to sample the sine wave at a predetermined point to signal the position of a specific amplitude of the secondary output.

8. The circuit apparatus of claim 1 wherein said means for dividing time is a crystal oscillator having a frequency of several thousands per second and said means to receive said segments is a counter set to accumulate at least a thousand segments per recycling.

9. The circuit apparatus of claim 1 wherein said means for dividing and said means to receive segments are contained in a programmed microprocessor.

10. A method for generating a waveform for a transformer and for specifying selected points at which to read the amplitude of an induced waveform in the secondary of said transformer including the following steps:

providing a means to segment time with a frequency sufficient to have at least a thousand segments per second, providing a means to accumulate, receive and positionally locate a predefined number of said segments for each waveform cycle, associating an output being waveform amplitude data for each of said located segments to define a waveform with respect to the time for each waveform cycle, releasing amplitude data associated with one or more of said segments in a given cycle for specifying particularly at least a point at which the amplitude of the generated waveform is monitored for use to control an output from the transformer secondary, and transmitting said released amplitude data to a sample and hold circuit connected to said transformer secondary circuit for measuring the transformer secondary output held by said circuit at that respective point.

* * * * *